(12) United States Patent
Meyer (10) Patent No.: US 12,236,295 B2
(45) Date of Patent: *Feb. 25, 2025

(54) SYSTEMS AND METHODS FOR ON DEMAND SERVICE INTEGRATION

(71) Applicant: Fidelity Information Services, LLC, Jacksonville, FL (US)

(72) Inventor: Scott Meyer, Jackson, WI (US)

(73) Assignee: FIDELITY INFORMATION SERVICES, LLC, Jacksonville, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/179,772

(22) Filed: Mar. 7, 2023

(65) Prior Publication Data
US 2023/0222023 A1 Jul. 13, 2023

Related U.S. Application Data (63) Continuation of application No. 16/929,891, filed on Jul. 15, 2020, now Pat. No. 11,630,712.

(51) Int. Cl.
| | |
|---|---|
| *G06F 9/54* | (2006.01) |
| *G06F 16/953* | (2019.01) |
| *G06F 21/62* | (2013.01) |
| *G06Q 30/016* | (2023.01) |
| *H04L 9/40* | (2022.01) |
| *H04L 67/51* | (2022.01) |
| *G06Q 40/02* | (2023.01) |

(52) U.S. Cl.
CPC ............ *G06F 9/547* (2013.01); *G06F 16/953* (2019.01); *G06F 21/6245* (2013.01); *G06Q 30/016* (2013.01); *H04L 63/10* (2013.01); *H04L 63/105* (2013.01); *H04L 67/51* (2022.05); *G06Q 40/02* (2013.01)

(58) Field of Classification Search
CPC ................................. G06F 9/547; H04L 63/10
See application file for complete search history.

(56) References Cited

U.S. PATENT DOCUMENTS

| | | | | |
|---|---|---|---|---|
| 2013/0019223 | A1* | 1/2013 | Patrascu | G06F 9/4494 |
| | | | | 717/100 |
| 2018/0276053 | A1* | 9/2018 | Kesavan | G06F 9/541 |
| 2020/0090135 | A1* | 3/2020 | Malcangio | H04W 12/084 |
| 2020/0195734 | A1* | 6/2020 | Samaan | H04L 67/63 |
| 2020/0314087 | A1* | 10/2020 | Zeck | G06F 3/0482 |

* cited by examiner

*Primary Examiner* — Esther B. Henderson
(74) *Attorney, Agent, or Firm* — FINNEGAN, HENDERSON, FARABOW, GARRETT & DUNNER, LLP (57) ABSTRACT

Systems and methods for on demand service integration. A system includes at least one processor and a storage medium storing instructions that, when executed by the one or more processors, cause the at least one processor to perform operations including receiving from a customer system a request to integrate a partner service with an integrator instance at the customer system and searching an integrator database for a partner service communication template based on the received request. The operations also include configuring the integrator instance to receive communications from a partner service instance based on the communication template and establishing a communication link between the integrator instance and the partner service instance.

20 Claims, 6 Drawing Sheets

Environment — 610

Details
Add the enterprise capabilities you'd like in the environment. When finished click submit to kick off the deployment of your selections. You can monitor your deployment by clicking "See Status".

Item 1:* Item selected
Item 2:* Item selected ▼+

Options ⊕
- ˅ Option 1 ⓘ
- ˅ Option 2 ⓘ
- ˄ Option 3 ⓘ

Number of Users: XXX
Number of Acc's: YYY

Dependencies:
  ∞ Dependency 1  ∞ Dependency 2
Components:
  ∞ Component 1  ∞ Component 2
  ∞ Component 1  ∞ Component 2

Catalog — 620

Components  Solutions  Partner Providers
[⊕ Partner 1]  [⊕ Partner 2]  [☑ Partner 3]

Summary — 630

Environment
Connection
  Components                 Dependencies:
   • Component 1              • Dependency 1
     • Subcomponent 1         • Dependency 2
     • Subcomponent 2
     • Subcomponent 3
     • Subcomponent 4
   • Component 2
Integrator
  Components                 Options
   • Component 1              • Option 1
     • Subcomponent 1
   • Component 2

FIG. 6

SYSTEMS AND METHODS FOR ON DEMAND SERVICE INTEGRATION

CROSS-REFERENCE TO RELATED APPLICATION

This is a continuation of application Ser. No. 16/929,891, filed Jul. 15, 2020, which is incorporated herein by reference in its entirety.

TECHNICAL FIELD

The present disclosure generally relates to computerized systems and methods for on demand service integration. In particular, embodiments of the present disclosure relate to inventive and unconventional systems for integrating partner services into a customer system.

BACKGROUND

Currently if one wants to integrate a partner service into a customer instance, it is necessary to manually configure not only each customer instance but also each partner instance that customer is trying to integrate. The amount of work required to integrate instances with partners is substantial, and can require significant amounts of time and prone to configuration errors.

Current methods exhibit a number of problems. The integrator and its partners have to work individually with each integration request, creating multiple challenges for the process such as need for constant communication between the parties to exchange instance information, manual configuration of each instance, delays and errors inherently present in such approach (e.g. human error, security flaws, etc.). The amount of work required to perform these integrations takes significant amount of time, customer is unable to use the system until the integration is complete while still paying the integrator for use of the computing resources, both the integrator and its partners have to employ additional people to support the integration and as a result efficiency of the existing approach suffers. On demand capabilities are not existent as each request must be processed by the integrator, integrator then must communicate with the partner and once partner is available establish a method of communication. Needless to say, these processes may take weeks before the integration is complete, are prone to human errors, and may possess security challenges associated with integrator and partner personal having access to sensitive data.

Therefore, there is a need for improved methods and systems for on demand integration of partner instances.

SUMMARY

One aspect of the present disclosure is directed to a system for on demand service integration, including at least one processor; and at least one non-transitory memory storing instructions that, when executed by the at least one processor cause the system to perform operations. The operations include receiving from a customer system a request to integrate a partner service with an integrator instance at the customer system and searching an integrator database for a partner service communication template based on the received request. The operations further include sending a request based on the communication template to the partner service. The operations also include configuring the integrator instance to receive communications from a partner service instance based on the communication template and establishing a communication link between the integrator instance and the partner service instance.

Another aspect of the present disclosure is directed to a system for on demand service integration, including at least one processor and at least one non-transitory memory storing instructions that, when executed by the at least one processor cause the system to perform operations. The operations include providing a service integrator with a communication template. The operations also include receiving a request based on the communication template from the service integrator. The operations further include configuring a partner service instance to receive communication from an integrator instance based on the communication template. The operations additionally include establishing a communication link between the partner service instance and the integrator instance.

Yet another aspect of the present disclosure is directed to a method for on demand service integration. The operations include providing a service integrator with a partner service communication template and receiving from a customer system a request to integrate a partner service with an integrator instance at the customer system. The operations further include searching an integrator database for the partner service communication template based on the received request and sending a request based on the communication template to the partner service. The operations also include configuring the integrator instance to receive communication from a partner service instance based on the communication template. The operations also include establishing a communication link between the integrator instance and the partner service instance.

Other systems, methods, and computer-readable media are also discussed herein.

DESCRIPTION OF THE DRAWINGS

The drawings are not necessarily to scale or exhaustive. Instead, emphasis is generally placed upon illustrating the principles of the embodiments described herein. The accompanying drawings, which are incorporated in and constitute a part of this specification, illustrate several embodiments consistent with the disclosure and, together with the description, serve to explain the principles of the disclosure. In the drawings.

DETAILED DESCRIPTION

Reference will now be made in detail to exemplary embodiments, discussed with regards to the accompanying drawings. In some instances, the same reference numbers will be used throughout the drawings and the following description to refer to the same or like parts. Unless otherwise defined, technical and/or scientific terms have the meaning commonly understood by one of ordinary skill in the art. The disclosed embodiments are described in sufficient detail to enable those skilled in the art to practice the disclosed embodiments. It is to be understood that other embodiments may be utilized and that changes may be made without departing from the scope of the disclosed embodiments. Thus, the materials, methods, and examples are illustrative only and are not intended to be necessarily limiting.

As disclosed herein, on demand service integration is performed between an integrator and a partner service. In some embodiments, the integrator may be a software as a service (SaaS) provider and partner service is either another SaaS or more limited service provider (e.g. specialized API service). SaaS as known in the art is a software distribution model in which a third-party provider hosts applications and makes them available to customers over the Internet. Neither integrator or partner service are limited to SaaS model and may also be for example an infrastructure as a service (IaaS) provider, a platform as a service (PaaS) provider, or the like.

Communication between system components is based on an application programming interface (API) which is a computing interface to a software component or a system, that defines how other components or systems can use it. An API may define the calls or requests that can be made, how to make them, the data formats that should be used, the conventions to follow, or the like. An API can be entirely custom, specific to a component, or it can be designed based on an industry standard to ensure interoperability. The system that provides the API may change its internal details "behind" that API without affecting its users. In the preferred embodiment communication between integrator and partner service is utilizing webhook methodology. Webhooks are user-defined callbacks which are usually triggered by an event. A webhook, in some embodiments, may be a system or method of augmenting or altering the behavior of a web page or web application with custom callbacks. These callbacks may be maintained, modified, and managed by third-party users and developers who may not necessarily be affiliated with the originating website or application. When an event occurs, the source makes a request to the URI configured for the webhook.

One example would be if a bank is attempting to integrate p2p money transfer service "MT". In this exemplary situation the bank will be a customer of the integrator and MT will be one of the partners. The bank will put a request with the integrator to start the integration process. In turn, the integrator will send a request to MT with a webhook containing parameters to callback to the bank endpoint. For example, MT will receive the address of the bank end point, access credentials, and client identification. Based on the request MT will be able to create and fully configure an instance for the integration with the bank systems located within the integrator system. As soon as MT instance is ready it provides a connection to the URL provided in the webhook request and the integration may be established.

Embodiments of the present disclosure are directed to systems and methods configured for on demand service integration.

Figure 1:
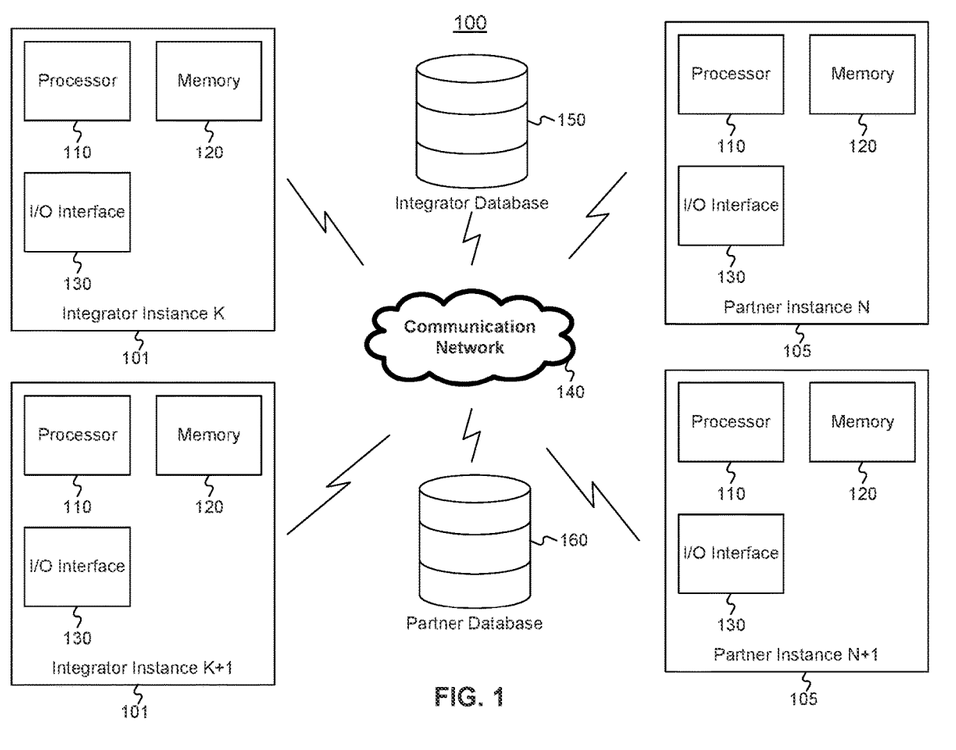
FIG. 1 is a schematic block diagram illustrating an exemplary embodiment of a system performing on demand service integration.

FIG. 1 depicts a schematic block diagram 100 illustrating an exemplary embodiment of a system for on demand service integration. As illustrated in FIG. 1, system 100 may include a variety of components and subsystems, each of which may be connected to one another, System 100 is not limited to the depicted exemplary embodiment and may comprise additional computerized systems, working in tandem, and connected via network 140. The systems may also be connected to one another via a direct connection, for example, using a cable.

System 100 comprises at least one of computing instances wherein the integrator instance 101 and partner instance 105 are computing instances comprising a processor 110. Processor 110 may comprise a microprocessor, including a central processing unit (CPU), a graphics processing unit (GPU), or other electronic circuitry capable of carrying out the instructions of a computer program by performing the operations specified by instructions stored in a memory 120. Alternatively, or concurrently, processor 110 may comprise one or more special-purpose devices built according to embodiments of the present disclosure using suitable circuit elements, e.g., one or more application-specific integrated circuits (ASICs), field-programmable gate arrays (FPGAs), or the like. Memory 120 may comprise volatile memory, such as random-access memory (RAM), a non-volatile memory, such as a hard disk drive, a flash memory, or the Ike, or any combination thereof.

Computing instances 101 and 105 further comprises an I/O Interface 130. I/O interface 130 may comprise any suitable hardware or software solution for input/output of data. I/O operations are accomplished through a wide assortment of external devices that provide a means of exchanging the data via inputs and outputs between the external environment and computing resources 101 and 105.

System 100 further comprises a communication network 140. Network 140 may be any type of network that facilitates communications and data transfer between components of system environment. Network 140 may be a Local Area Network (LAN), a Wide Area Network (WAN), such as the Internet, or any other kind of network. Network 140 may be a single network or a combination of networks. Further, network 140 may reflect a single type of network or a combination of different types of networks, such as the Internet and public exchange networks for wireline and/or wireless communications. Network 140 may use cloud computing technologies. Network 140 is not limited to the above examples and system 100 may implement any type of network that allows the components and entities (not shown) included in FIG. 1 to exchange data and information.

System 100 further comprises an integrator database 150 and a partner database 160. Databases 150 and 160 may include one or more computing devices configured to provide data to one or more of computing instances 101 and 105. In some aspects, such data may include customer information, instance information, shared secrets, connection information, etc. Databases 150 and 160 may include, for example, one or more Oracle™ databases, Sybase databases, or other relational databases or non-relational databases, such as Hadoop™ sequence files, HBase™, or Cassandra™ Database(s) 150 and 160 may include computing components (e.g., database management system, database server, etc.) configured to receive and process requests for data stored in memory devices of the database(s) and to provide data from the database(s). Database(s) 150 and 160 may be merged in one database accessed by both partner and integrator. While databases 150 and 160 are shown separately, in some embodiments databases 150 and 160 may be included in or otherwise related to one or more instances of system 100.

Figure 2A:
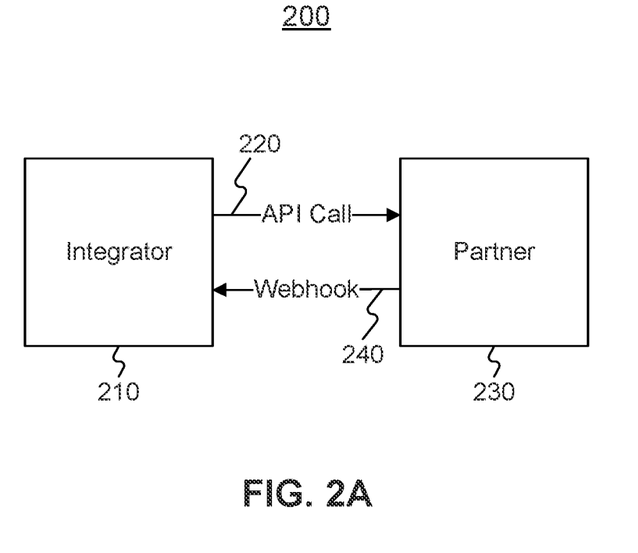
FIG. 2A is a schematic block diagram illustrating an overall broad view of the reverse integration process flow, consistent with the disclosed embodiments.

As depicted in FIG. 2A, integrator 210 may comprise at least one integrator instance 101 and integrator database 150, consistent with earlier disclosure. Partner 230 may comprise at least one partner instance 105 and partner database 160, consistent with earlier disclosure. API call 220, webhook 240, and further request/responses are passed through communication network 140.

Integrator 210 initiates an API call 220 to provide a callback URI (Uniform Resource Identifier) or URL (Uniform Resource Locator) to partner 230. For the purposes of this disclosure URL is a subset of URI. Partner in turn uses the URI provided in the API call 220 to make a webhook request 240 to that URI whenever an event 255 of interest occurs, in the exemplary embodiment the event 255 will be an established partner instance 105 ready for integration with an integrator instance 101.

Figure 2B:
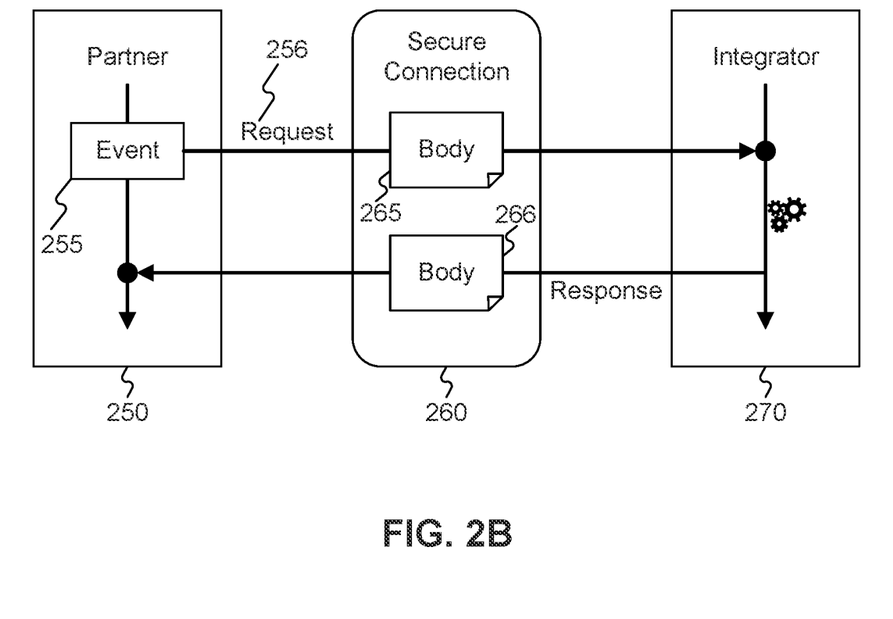
FIG. 2B is a schematic block diagram illustrating a more detailed view of the reverse integration process flow shown on FIG. 2A, consistent with the disclosed embodiments.

Event 255 initiates a next step in the process of system 100, depicted on FIG. 2B. After the event 255 occurs, partner 250 sends the request 256 to the integrator 270 over the secure connection 260. The request may contain data required for establishing integration with a new partner instance, establishing security model of communication with the said instance, as well as any other information necessary for successful integration process. Necessary information may be specified by the partner and may comprise environment name, endpoint fully qualified name, network address, client identification, encryption information, certificates, passwords or the like.

Integrator 270 responds to the request received from the partner 250 as soon as it is received. Information received in the body 265 of the request 256 is passed to an integrator instance for pre-establishing integration and security model with the partner. The result is near real time, on demand integration on the side of the integrator, occurring as soon as partner instance is ready. Integrator may respond back to the partner with confirmation of the successful integration, requests for additional data, error information, etc.

Figure 3:
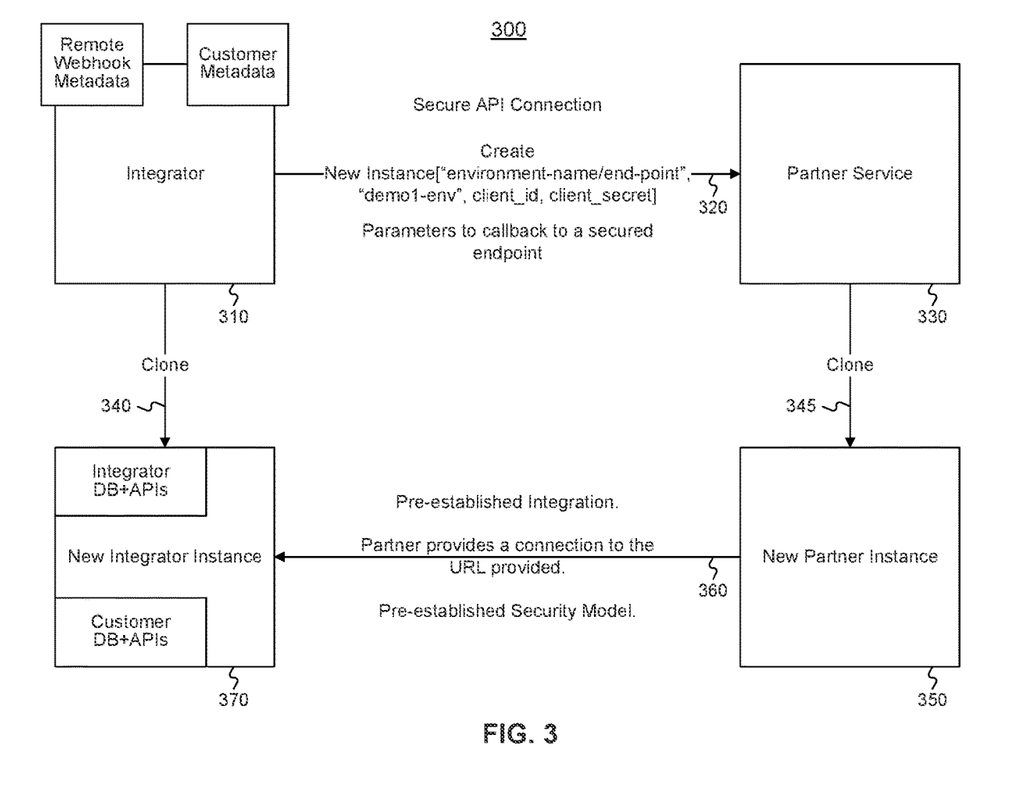
FIG. 3 is a schematic block diagram illustrating additional level of detail of an exemplary embodiment of a reverse integration process previously shown in FIG. 2, consistent with the disclosed embodiments.

FIG. 3 depicts a schematic block diagram 300 illustrating an additional level of detail of an exemplary embodiment of a reverse integration process depicted in FIGS. 2A and 2B. Consistent with the disclosed embodiments, integrator 310 may comprise at least one integrator instance 101 and integrator database 150, and partner service 330 may comprise at least one partner instance 105 and partner database 160.

Integrator 310, in some embodiments, may store or have access to remote webhook metadata, and customer metadata. Remote webhook metadata may be stored in the integrator database 150, or received from the partner database 160. Remote webhook metadata may contain information related to establishing communications with the partner service 330, such as information necessary to establish an API link or any other type of supported connection with the partner and information required by the specified partner. Customer metadata may be stored in the integrator database 150 and may contain customer related information, e.g. customer databases, customer custom APIs, etc.

Partner service 330 may be pre-approved, in which case remote webhook metadata already exists in the integrator database 150 and if current will be used to establish a secure API connection 320.

OAuth may be used for securing API connections. OAuth (Open Authorization) is an open standard for access delegation. It enables users to give third-party access to web resources without having to share passwords. Secure API connection 320 between the integrator and the partner may be implemented as either REST (Representational State Transfer) or SOAP (Simple Object Access Protocol) or the like. Implementation of the secure API connection 320 is not limited to the identified herein protocols.

REST APIs use HTTP and support Transport Layer Security (TLS) encryption. TLS is a standard that keeps an internet connection private and checks that the data sent between two systems (a server and a server, or a server and a client) is encrypted and unmodified. This means that a hacker trying to expose a credit card information can neither read data nor modify it. REST APIs also use JavaScript Object Notation (JSON), which is a file format that makes it easier to transfer data over web browsers. By using HTTP and JSON, REST APIs don't need to store or repackage data, making them much faster than SOAP APIs.

SOAP APIs use built-in protocols known as Web Services Security (WS Security). These protocols define a rules set that is guided by confidentiality and authentication. SOAP APIs support standards set by the two major international standards bodies, the Organization for the Advancement of Structured Information Standards (OASIS) and the World Wide Web Consortium (W3C). They use a combination of XML encryption, XML signatures, and SAML tokens to verify authentication and authorization. In general, SOAP APIs have more comprehensive security measures, but they also need more management and typically used for organizations handling sensitive data such as banks.

In the event the metadata is outdated, integrator may first update remote webhook metadata from the partner database 160. It partner service 330 is not pre-approved, partner service may become pre-approved by providing remote webhook metadata and any other information requested by the integrator 310.

API connection 320 may be used to pass from integrator 310 to partner service 330 parameters to callback to a secured endpoint, which may be the new integrator instance 370 or any other instance within the integrator 310 network. An example of the request sent over the established secure API connection 320, may be a request to create a new partner instance for the integration. The request may look as shown: New Instance ["environment-name/end-point", "demo1-env", client_id, client_secret, security]. In the above example of the request: "environment-name/end-point" may specify a FQN (fully qualified name) name of the endpoint, which is an unambiguous name referring to the endpoint without regard to the context of the call; "demo1-env" may specify name of the environment; client_id may specify unique client_identifier; client_secret may specify a system of rules to convert information—such as a letter, word, sound, image—into another form or representation, for communication through a communication channel or storage in a storage medium; and security may specify access level which denotes the set of permissions or restrictions provided to a data type, it restricts variable modification to only the methods defined within the security parameter, in general, a given object cannot be created, read, updated or deleted by any function without having a sufficient access level.

The request may contain more or less data based on the partner service and established communication template. The exemplary request illustrates a requested to create a new instance for the specified customer end-point. The exemplary request provides URI, instance name, client identification, secret, and a security access level, Other requests may include updating configuration of existing partner instance, adding to the existing partner instance, etc.

The exemplary process illustrated in FIG. 3 shows integration of a new integrator instance 370, which may be a subsystem of the existing customer system, with a new partner instance 350. In some embodiments, integration is a process of linking together different computing systems and software applications to act as a coordinated whole. New instances may be created by cloning existing templates 340/345. Cloned instances is a preferred approach as configuration time is further reduced as templated instances may be preconfigured to Include links to integrator and customer databases and APIs. The process is not limited to the to the depicted exemplary embodiment.

After the new partner instance 350 is established, partner service 330 provides a connection to the URI provided by the integrator 310. In response to receiving the webhook, integrator 310 configures new instance 370 to communicate new partner instance 350. New integrator instance 370 is configured to utilize pre-established integration with the partner, pre-established security model may also be used. After the integration is pre-established customer may be given access to the new integrator system for further use and/or customization based on the customer needs.

Figure 4:
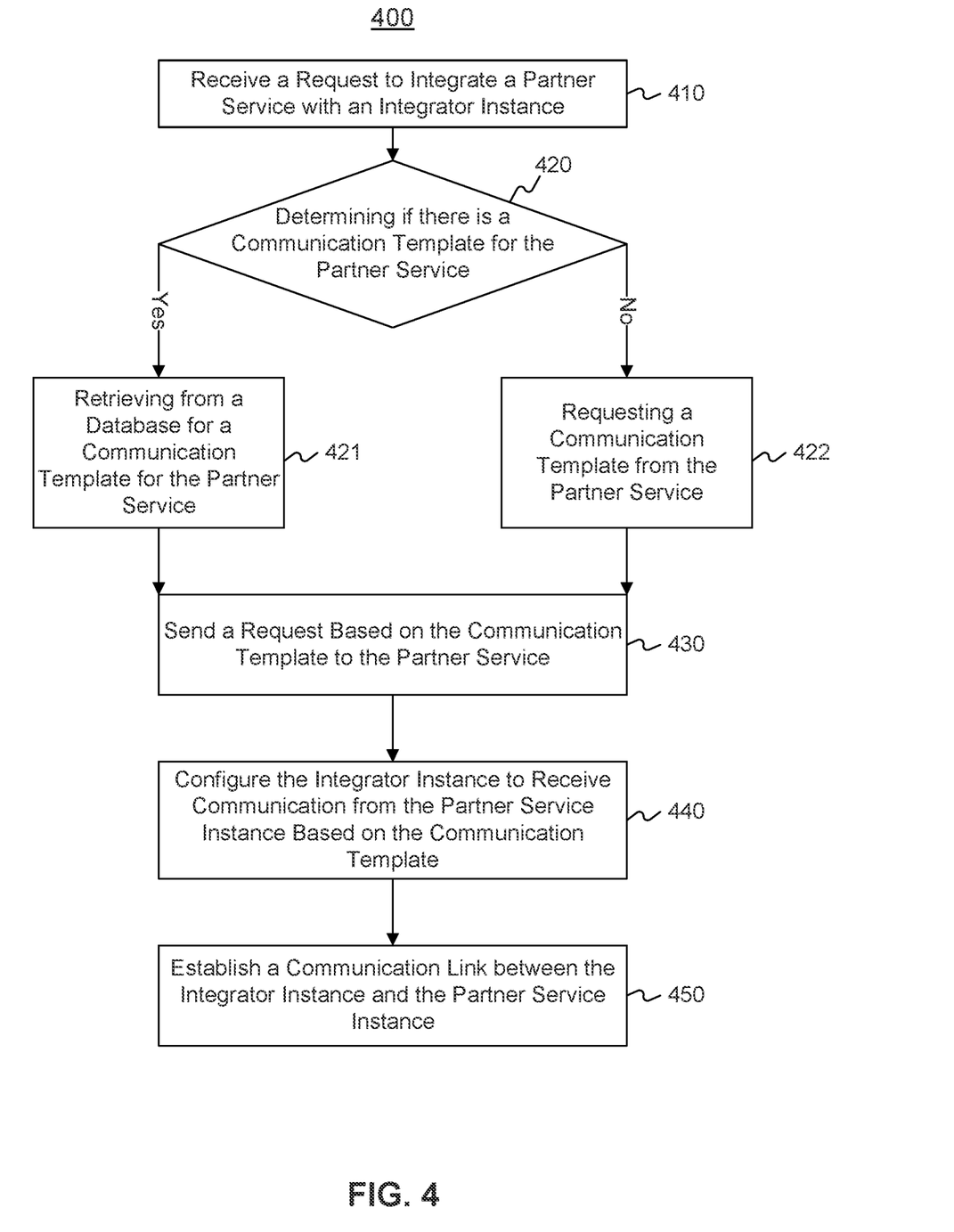
FIG. 4 is a flow chart of an exemplary method for on demand service integration process by an integrator, consistent with the disclosed embodiments.

FIG. 4 is a flow chart of a process 400 for reverse integration process by an integrator, consistent with the disclosed embodiments. Process 400 begins at step 410 with receiving by the integrator a request to integrate a partner service with an integrator instance. Request may be initiated directly by the customer willing to integrate specific service into a customer system. Request may also be generated by the system 100 itself based on a dependency caused by the customer request.

Process 400 then proceeds to step 420. In step 420, system 100 may determine if the integrator has a communication template for the partner service. If yes process 400 continues with step 421, where system 100 may search an integrator database 150 for a partner service communication template, Communication template may provide data necessary for establishing a communication with a partner service. Necessary data may be specified by the partner and may comprise environment name, endpoint fully qualified name, network address, client identification, encryption information, certificates, passwords or the Ike. Alternatively, if the integrator does not have a communication template for the partner service process 400 continues with step 422, where system 100 may request a communication template from the partner service. In one embodiment if the partner service is pre-approved, the communication template will be located in the integrator database 150, and if the partner service is not pre-approved, a communication template may be supplied. Alternatively a pre-approval process may be initiated. Integrator may pull the communication template from the partner service database 160 if connection between partner service and the integrator is available based on earlier interactions between the integrator and the partner.

Process 400 then proceeds to step 430, where the system 100 sends a request from the integrator to the partner service based on the communication template. The request may specify integration parameters for the integrator instance. The request 430 may further specify if partner service 330 should create a new instance or utilize an existing instance for the integration. The request 430 may further specify URI for the customer system, security level for any of the customer data, and security model. Security model may comprise type of the encryption, necessary secrets, keys, certificates, etc. Necessary data is based on the selected security model. For example two kinds of encryption that may be used are symmetric encryption and asymmetric encryption. Asymmetric encryption is also known as public key encryption. In symmetric encryption, there is only one key, and all communicating parties use the same key for encryption and decryption. In asymmetric, or public key, encryption, there are two keys: one key is used for encryption, and a different key is used for decryption. Either key can be used for either action, but data encrypted with the first key can only be decrypted with the second key, and vice versa. One key is kept private, while one key is shared publicly, for anyone to use—hence the "public key" name. Asymmetric encryption is a foundational technology for SSL (TLS).

Process 400 then proceeds to step 440, where, the system 100 configures an integrator instance to receive communication form the partner service instance based on the communication template. Integrator instance may be existing or newly created instance. Integrator instance 370 may be cloned from a customer template, as used herein cloning refers to the making of an exact copy of an object (instance), or created from scratch and manually configure prior to the integration. Cloning is a process where existing system with all of its configurations copied in its entirety with different identification, simplifying configuration process.

Process 400 then proceeds to step 450, where a communication link between the integrator instance and the partner service is established. The communication link may have pre-configured security model based on the communication template. Once the communication k is established the integrator instance is considered to have a pre-established integration with the partner service and may be handed off to the customer for further configuration and/or customization as necessary.

Figure 5:
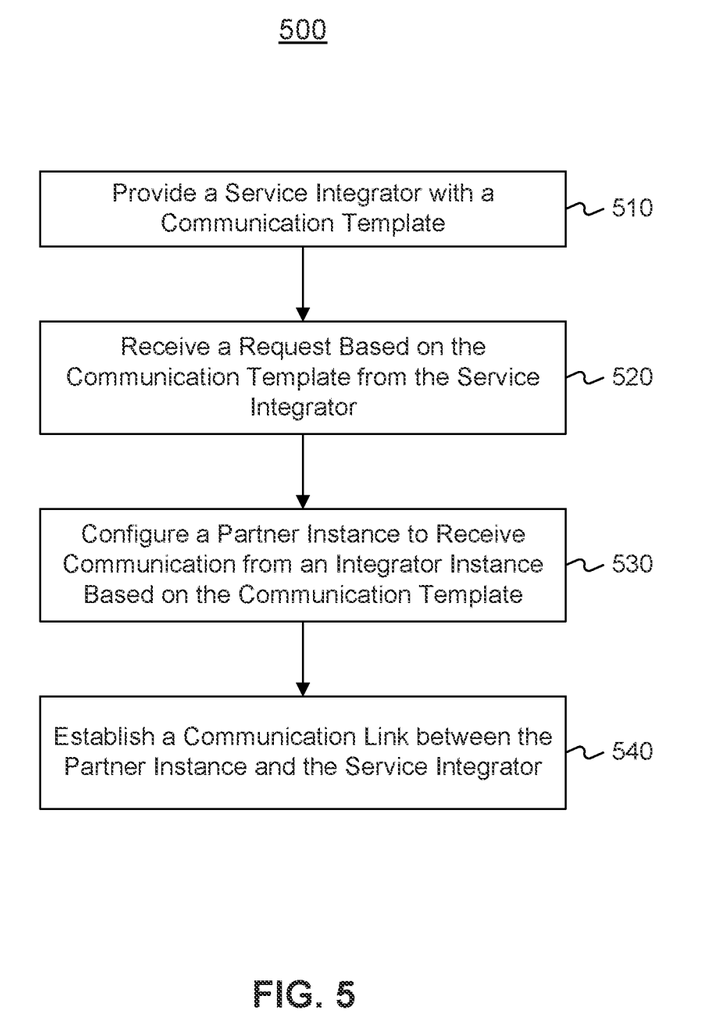
FIG. 5 is a flow chart of another exemplary method for on demand service integration process by a partner service, consistent with the disclosed embodiments.

FIG. 5 illustrates an outline of another process 500 for reverse integration process. While process 400 of FIG. 4 described a process performed by the integrator, process 500 illustrates the process performed by the partner service. Process 500 starts at step 510 with providing a service integrator with a communication template. Communication template may serve as a pre-approval of the select partner service. Communication template provides service integrator with all necessary information for complete integration with the service. Partner database 160 may contain information if the communication template was already provided to the integrator. If the partner service determines that the communication template was already provided based on checking the partner database 160 partner may skip this step as it is assumed that integrator already possess the communication template and will request an updated one if needed.

Process 500 then proceeds to step 520, where partner service 330 receives a request from the service integrator based on the communication template, Consistent with earlier disclosure, the request may comprise all necessary information about the integrator instance 370 as well as any additional details outlining security aspect of data that may be transmitted between the partner and the integrator. Necessary information may comprise environment name, endpoint fully qualified name, network address, client identification, encryption information, certificates, passwords or the like.

Process 500 then proceeds to step 530, where partner service 330 configures a partner instance 350 to receive communications from an integrator instance based on the communication template. Partner may configure a new instance, or clone a template preconfigured for use with a specific integrator. Configured partner instance have to comply with the requirements specified in the communication template and ready to communicate with the integrator instance as soon as connection is established. Compliance with the requirements specified in the communication template is ensured by the partner service by strictly following communication template received from the integrator prior to sending a webhook response back.

Process 500 then proceeds to step 540, where a communication link between the integrator instance and the partner service is established. The communication link may have pre-configured security model based on the communication template. After the communication is established the integration is complete on the partner side. Customer and integrator may be provided details regarding the connection, instance, and status of the integration. The communication link may be used for any type of data transmission based on the integrated service. Examples include file transmission, database updates, opening an API link, establishing a tunnel, etc.

Figure 6:
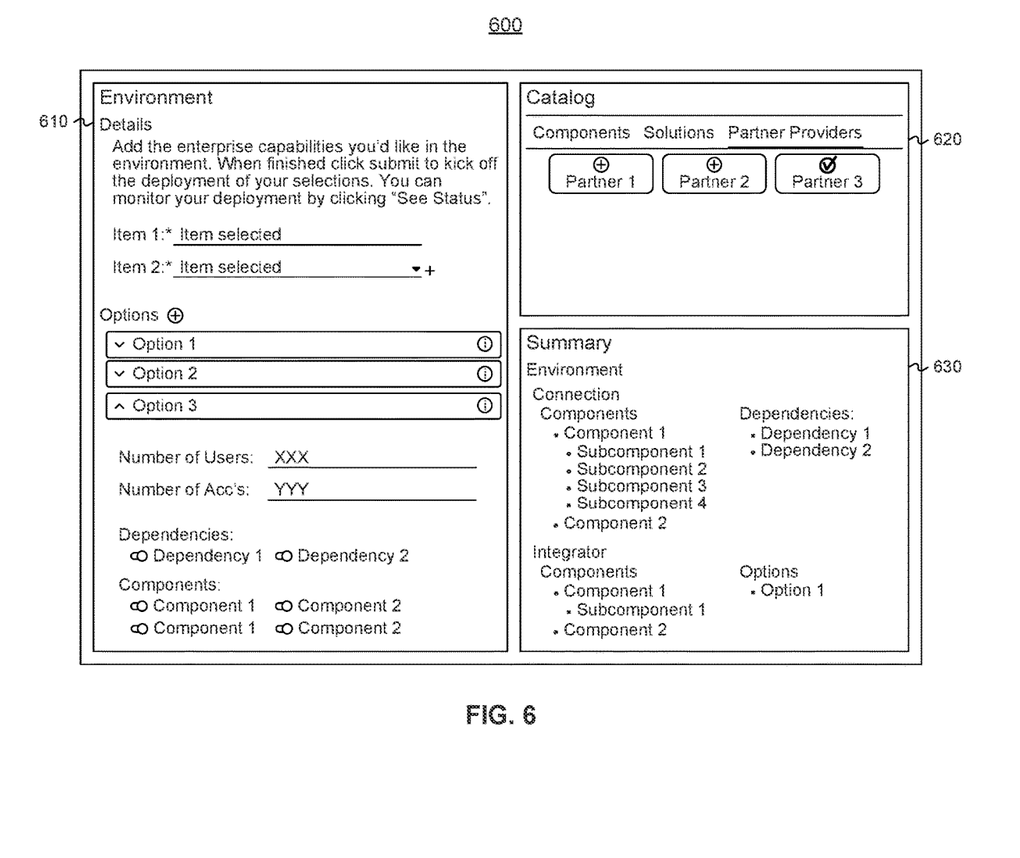
FIG. 6 is a line drawing of an exemplary user interface used with the system for on demand service integration.

FIG. 6 shows a line drawing of an exemplary user interface (UI) 600 used with the system for on demand service integration. UI may be split into 3 sections. Section 610, identifying user environment. Section 620, allowing a selection of a partner service form a catalog. Section 630, displaying a summary of the selected options in sections 610 and 620.

Section 610 of the UI 600 may allow the customer to select a specific environment ("Item 1") and specific instance ("Item 2") as shown, with which to integrate a partner service. Further additional options may be specified for the integration consistent with earlier disclosure. Options may include but are not limited to types of API used, security configurations, certificate/secret information, etc. The example shown as "Option 3" specifies number of users the customer is planning to integrate the service with and the number of accounts. Since some users may have multiple accounts those numbers may be different, and may affect the integration and/or agreements with the partner. Some options may have dependencies, e.g. if one type of API is selected another will not be available, or additional partners may need to be integrated for selected option. Further, some options may have additional components that may be selected, i.e. additional functionality for money transfers.

Section 620 of the UI 600 may allow the customer to select specific components/solutions and/or partner providers for the integration. Recommendations may be provided based on the options selected in section 610. For example, the integrator may provide necessary solution for implementations of specific API. The illustrated example shows selection by the customer one of the partner providers satisfying options selected by the customer in section 610. As one example, the customer may specify that they need at least 1000 users, so only partners who are able to handle 1000 users will be shown, and customer will be able to make final selection.

Section 630 of the UI 600 may allow the customer to verify final selection before submitting an integration request, This section may be auto-populated based on the option selected in sections 610 and 620.

Furthermore, although aspects of the disclosed embodiments are described as being associated with data stored in memory and other tangible computer-readable storage mediums, one skilled in the art will appreciate that these aspects can also be stored on and executed from many types of tangible computer-readable media, such as secondary storage devices, Ike hard disks, floppy disks, or CD-ROM, or other forms of RAM or ROM. Accordingly, the disclosed embodiments are not limited to the above-described examples, but instead are defined by the appended claims in light of their full scope of equivalents.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application, which examples are to be construed as non-exclusive. Further, the steps of the disclosed methods can be modified in any manner, including by reordering steps or inserting or deleting steps. It is intended, therefore, that the specification and examples be considered as example only, with a true scope and spirit being indicated by the following claims and their full scope of equivalents.

It is intended that the appended claims cover all systems and methods falling within the true spirit and scope of the disclosure. As used herein, the indefinite articles "a" and "an" mean "one or more." Similarly, the use of a plural term does not necessarily denote a plurality unless it is unambiguous in the given context. Words such as "and" or "or" mean "and/or" unless specifically directed otherwise. Further, since numerous modifications and variations will readily occur from studying the present disclosure, it is not desired to limit the disclosure to the exact construction and operation illustrated and described, and accordingly, all suitable modifications and equivalents may be resorted to, falling within the scope of the disclosure.

The foregoing description is presented for purposes of illustration. It is not exhaustive and is not limited to the precise forms or embodiments disclosed. Modifications and adaptations of the embodiments will be apparent from consideration of the specification and practice of the disclosed embodiments.

Computer programs based on the written description and methods of this specification are within the skill of a software developer. The various programs or program modules can be created using a variety of programming techniques. One or more of such software sections or modules can be integrated into a computer system, non-transitory computer readable media, or existing software.

Moreover, while illustrative embodiments have been described herein, the scope includes any and all embodiments having equivalent elements, modifications, omissions, combinations (e.g., of aspects across various embodiments), adaptations or alterations based on the present disclosure. The elements hi the claims are to be interpreted broadly based on the language employed in the claims and not limited to examples described in the present specification or during the prosecution of the application. These examples are to be construed as non-exclusive. Further, the steps of the disclosed methods can be modified in any manner, including by reordering steps or inserting or deleting steps. It is intended, therefore, that the specification and examples be considered as exemplary only, with a true scope and spirit being indicated by the following claims and their full scope of equivalents.

What is claimed is:

1. A system for on demand integration, the system comprising:
   a memory storing instructions; and
   at least one processor configured to execute the instructions to perform operations comprising:
      receiving from a customer system a request to integrate a partner service with an integrator instance, the integrator instance being located at the customer system;
      sending the received request to the partner service;

sending, for display, a user interface, to the customer system, the user interface being configured to enable at least one user selection for configuration of the integrator instance; and configuring the integrator instance located at the customer system to receive communications from a partner service instance based on the at least one user selection.

2. The system of claim 1, wherein the user interface is further configured to display user environment data for user selection.

3. The system of claim 2, wherein the user environment data includes at least one of: a number of users, a type of application programming interface (API), a security configuration, or certificate information.

4. The system of claim 1, wherein the user interface is further configured to display instance data for user selection.

5. The system of claim 1, wherein the user interface is further configured to display partner service data for user selection.

6. The system of claim 1, wherein the user interface is further configured to display one or more dependencies based on the at least one user selection.

7. The system of claim 1, wherein the user interface is further configured to display one or more additional components, based on the at least one user selection, for at least a second user selection.

8. The system of claim 1, wherein the user interface includes a first section configured to display user environment data for user selection, a second section configured to display partner service data for user selection, and a third section configured to display a summary of selected options from the first and second sections.

9. The system of claim 1, wherein the user interface is further configured to display recommended options for further user selection based on the at least one user selection.

10. A method for on demand integration, the method comprising:

receiving from a customer system a request to integrate a partner service with an integrator instance, the integrator instance being located at the customer system;

sending the received request to the partner service;

sending, for display, a user interface to the customer system, the user interface being configured to enable at least one user selection for configuration of the integrator instance; and configuring the integrator instance located at the customer system to receive communications from a partner service instance based on the at least one user selection.

11. The method of claim 10, wherein the user interface is further configured to display user environment data for user selection.

12. The method of claim 11, wherein the user environment data includes at least one of: a number of users, a type of application programming interface (API), a security configuration, or certificate information.

13. The method of claim 10, wherein the user interface is further configured to display instance data for user selection.

14. The method of claim 10, wherein the user interface is further configured to display partner service data for user selection.

15. The method of claim 10, wherein the user interface is further configured to display one or more dependencies based on the at least one user selection.

16. The method of claim 10, wherein the user interface is further configured to display one or more additional components, based on the at least one user selection, for at least a second user selection.

17. The method of claim 10, wherein the user interface is further configured to display user environment data for user selection, partner service data for user selection, and a summary of user-selected options.

18. The method of claim 10, wherein the user interface is further configured to display recommended options for further user selection based on the at least one user selection.

19. A non-transitory computer-readable medium storing code for on demand integration, the code comprising instructions executable to:

receive from a customer system a request to integrate a partner service with an integrator instance, the integrator instance being located at the customer system;

send the received request to the partner service;

send, for display, a user interface to the customer system, the user interface being configured to enable at least one user selection for configuration of the integrator instance; and configure the integrator instance located at the customer system to receive communications from a partner service instance based on the at least one user selection.

20. The non-transitory medium of claim 19, wherein the user interface is further configured to display user environment data for user selection, partner service data for user selection, and a summary of user-selected options.

* * * * *